US008619345B2

(12) United States Patent
Han (10) Patent No.: US 8,619,345 B2
(45) Date of Patent: Dec. 31, 2013

(54) IMAGE READING DEVICE AND IMAGE FORMING APPARATUS HAVING THE SAME

(75) Inventor: Dong Hun Han, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/487,629

(22) Filed: Jun. 4, 2012

(65) Prior Publication Data

US 2012/0327485 A1   Dec. 27, 2012

Related U.S. Application Data

(63) Continuation of application No. 11/972,165, filed on Jan. 10, 2008, now Pat. No. 8,208,182.

(30) Foreign Application Priority Data

Jul. 24, 2007   (KR) .................................. 2007-74167

(51) Int. Cl.
   *H04N 1/04*   (2006.01)
(52) U.S. Cl.
   USPC ........... 358/496; 358/408; 358/498; 358/497; 358/474
(58) Field of Classification Search
   None
   See application file for complete search history.

(56) References Cited

U.S. PATENT DOCUMENTS

| 5,093,734 A * | 3/1992 | Gerlach ........................ 358/474 |
| 7,413,177 B2 * | 8/2008 | Mori et al. .................. 270/58.09 |
| 7,420,711 B2 * | 9/2008 | Okawa ......................... 358/3.26 |
| 7,518,763 B2 * | 4/2009 | Shiraishi et al. ............. 358/475 |
| 7,561,315 B2 * | 7/2009 | Hiraoka et al. ............... 358/498 |
| 7,796,310 B2 * | 9/2010 | Hasegawa et al. ............ 358/488 |
| 2002/0039207 A1 | 4/2002 | Kanda |
| 2004/0223796 A1 * | 11/2004 | Iwata ............................ 399/367 |
| 2010/0102234 A1 * | 4/2010 | Hamasaki et al. ......... 250/341.7 |
| 2010/0202680 A1 * | 8/2010 | Hamasaki et al. ............ 382/137 |
| 2011/0188095 A1 * | 8/2011 | Shiraishi ...................... 358/474 |
| 2012/0275644 A1 * | 11/2012 | Kasuya et al. ................ 382/100 |

FOREIGN PATENT DOCUMENTS

| CN | 1402094 | 3/2003 |
| CN | 2822057 | 9/2006 |
| JP | 2005-191795 | 7/2005 |
| JP | 2007143014 | 6/2007 |

OTHER PUBLICATIONS

Chinese Office Action issued Jun. 24, 2011 in China Patent Application No. 2008100045628.
Korean Office Action dated Jun. 19, 2013 issued in KR Application No. 10-2007-0074167.

* cited by examiner

*Primary Examiner* — Cheukfan Lee
(74) *Attorney, Agent, or Firm* — Stanzione & Kim, LLP (57) ABSTRACT

An image reading device and an image forming apparatus having the same that can increase a scan quality by mounting positions of units to read information recorded on a document and a mounting structure of a light shielding member. The image reading device may include a first reading unit to read image information recorded on a first surface of a document, a second reading unit disposed at a predetermined distance from the first reading unit along a document feeding direction to read image information recorded on a second surface of the document, and at least one light shielding member mounted between the first reading unit and the second reading unit along the document feeding direction. The light shielding member, which may include a document guide portion, may extend in a direction different from the document feeding direction such that one end portion is located in a document feeding path.

23 Claims, 6 Drawing Sheets

IMAGE READING DEVICE AND IMAGE FORMING APPARATUS HAVING THE SAME

CROSS-REFERENCE TO RELATED APPLICATIONS

This application is a Continuation of U.S. application Ser. No. 11/972,165, filed Jan. 10, 2008 now U.S. Pat. No. 8,208,182 which claims the benefit of Korean Patent Application No. 2007-0074167, filed on Jul. 24, 2007 in the Korean Intellectual Property Office, the disclosure of which is incorporated herein by reference.

BACKGROUND OF THE INVENTION

1. Field of the Invention

The present general inventive concept relates to an image reading device and an image forming apparatus having the same, and more particularly to an image reading device and an image forming apparatus having the same that is capable of duplex (double-sided) scanning.

2. Description of the Related Art

An image forming apparatus is an apparatus that prints an image on a printing medium, e.g., paper, according to an inputted image signal. An image forming apparatus may be classified as a printer, a copying machine, a multi-function printer with multiple functions of printing, copying, scanning, and the like. For example, a multi-function printer can perform a printing function of printing an image in response to image information from an external apparatus such as a computer, etc., a reading function of reading image information recorded on a document and retaining the image information in a recording medium, a copying function of printing an image in response to scanned image information, and a fax function of transmitting scanned image information to a remote place through communication links.

In order to achieve the above functions, a multi-function image forming apparatus is equipped with an image reading device to read image information recorded on a document. An example of a conventional image reading device is disclosed in Japanese Patent Laid-Open Publication No. 2005-191795. The disclosed conventional image reading device may perform duplex (double-sided) scanning. The conventional image reading device includes a first image sensor unit and a second image sensor unit, which are oppositely arranged on both surfaces of a document, to simultaneously read information recorded on both the surfaces of the document.

In this type of image reading device, because two image sensor units oppose each other and respectively irradiate light to a front surface and a rear surface of the document, the light irradiated from one image sensor unit affects the other opposite image sensor unit and deteriorates a scan quality. To address this problem, the disclosed conventional image reading device is equipped with a light shielding member that is mounted inside the image sensor unit to shield light irradiated from a light source from being transmitted to a light receiving element of the other opposite image sensor unit.

However, in the conventional image reading device, the light irradiated from the light source of the image sensor unit (e.g., the first image sensor unit) may be reflected from the light shielding member and transmitted to the light receiving element of the same image sensor unit (the first image sensor unit), which may cause the light receiving element to detect light unrelated to image information of the document and/or deteriorate a scan quality.

Also, because the light shielding member, which is formed in a plastic plate or coated with paint, is mounted inside the image sensor unit, an inner structure of the image sensor unit and an assembling process of the image sensor unit may become complicated.

Also, when two image sensor units oppositely arranged on both the surfaces of the document irradiate light to the front surface and the rear surface of the document, the light irradiated toward the front surface of the document interferes with the light irradiated toward the rear surface of the document. Thus, the information about the image recorded on the document is distorted, and a scan quality may be deteriorated.

SUMMARY OF THE INVENTION

The present general inventive concept provides an image reading device, an image forming apparatus having the same and methods thereof that can increase a scan quality by improving mounting positions of units (e.g., reading units) to read information recorded on a document or a mounting structure of a light shielding member.

The present general inventive concept also provides an image reading device and an image forming apparatus having the same that can facilitate the installation of a light shielding member without complicating structures of reading units.

Additional aspects and/or utilities of the general inventive concept will be set forth in part in the description which follows and, in part, will be obvious from the description, or may be learned by practice of the general inventive concept.

The foregoing and/or other aspects and utilities of the present general inventive concept may be achieved by providing an image reading device including a first reading unit to read image information recorded on a first surface of a document, a second reading unit disposed at a predetermined distance from the first reading unit along a document feeding direction to read image information recorded on a second surface of the document, and at least one light shielding member mounted between the first reading unit and the second reading unit along the document feeding direction.

The at least one light shielding member may extend in a direction different from the document feeding direction.

The at least one light shielding member may be provided with a document guide portion to guide the document.

The image reading device may further include a scanning frame and a cover to cover the scanning frame. The first reading unit and the second reading unit may be respectively disposed in the scanning frame and the cover, and the at least one light shielding member may be mounted in at least one of the scanning frame or the cover.

The at least one light shielding member may be integrally formed with at least one of the scanning frame or the cover.

The first reading unit and the second reading unit may respectively include a first reading unit case and a second reading unit case to form an external appearance. The at least one light shielding member may be mounted on at least one of the first reading unit case or the second reading unit case.

The at least one light shielding member may be integrally formed with at least one of the first reading unit case or the second reading unit case.

The at least one light shielding member may be made of a flexible material or an elastically deformable material.

The at least one light shielding member may include a first light shielding member and a second light shielding member disposed at a predetermined distance from the first light shielding member along the document feeding direction.

At least one of the first reading unit and the second reading unit may read the image information of the document with light, and the at least one light shielding member may have a dark color.

The foregoing and/or other aspects and utilities of the present general inventive concept may also be achieved by providing an image forming apparatus including the above described image reading device.

The foregoing and/or other aspects and utilities of the present general inventive concept may also be achieved by providing an image forming apparatus having an image reading device including a main body having a document feeding path, a first reading unit to read image information recorded on a first surface of the document passing through the document feeding path, and a second reading unit to read image information recorded on a second surface of the document passing through the document feeding path, the second reading unit being disposed in misalignment with the first reading unit along a document feeding direction and at least one light shielding member mounted between the first reading unit and the second reading unit along the document feeding direction to shield light irradiated toward the document from at least one of the first reading unit or the second reading unit from being transmitted to the other reading unit.

The at least one light shielding member may extend (e.g., vertically) to locate one end portion of the light shielding member in the document feeding path.

The main body of the image reading device may include a scanning frame mounted with the first reading unit and a cover mounted with the second reading unit. The at least one light shielding member may include a first light shielding member to extend from the cover toward the document feeding path, and a second light shielding member to extend from the scanning frame toward the document feeding path.

The first light shielding member and the second light shielding member may be integrally formed with the cover and the scanning frame, respectively.

The first reading unit and the second reading unit may respectively include a first reading unit case and a second reading unit case. The at least one light shielding member may include a first light shielding member to extend from the second reading unit case toward the document feeding path, and a second light shielding member to extend from the first reading unit case toward the document feeding path.

The first light shielding member and the second light shielding member may be respectively integrally formed with the second reading unit case and the first reading unit case.

The at least one light shielding member may be provided with an inclination surface to guide the document passing through the document feeding path.

The at least one light shielding member may be made of a flexible material or an elastically deformable material.

The foregoing and/or other aspects and utilities of the present general inventive concept may also be achieved by providing a light shielding member of an image reading device mounted between two reading units along a document feeding direction. The light shielding member extends in a direction different from the document feeding direction to reduce light interference between the two reading units.

The foregoing and/or other aspects and utilities of the present general inventive concept may also be achieved by providing an image forming apparatus including an image reading device including a first reading unit to read image information recorded on a first surface of a document, and a second reading unit disposed in misalignment with the first reading unit along a document feeding direction to read image information recorded on a second surface of the document, and at least one light shielding member mounted between the first reading unit and the second reading unit along the document feeding direction to reduce receipt of light irradiated toward the document from at least one of the first reading unit or the second reading unit by the other reading unit.

The foregoing and/or other aspects and utilities of the present general inventive concept may also be achieved by providing a light shielding member of an image reading device positioned at a document feeding path between two reading units configured to concurrently operate, the light shielding member to extend in a direction different from the document feeding path to reduce light interference between the two reading units.

BRIEF DESCRIPTION OF THE DRAWINGS

These and/or other aspects and/or utilities of the exemplary embodiments of the general inventive concept will become apparent and more readily appreciated from the following description of the embodiments, taken in conjunction with the accompanying drawings, of which.

DETAILED DESCRIPTION OF THE PREFERRED EMBODIMENTS

Reference will now be made in detail to exemplary embodiments of the present general inventive concept, examples of which are illustrated in the accompanying drawings, wherein like reference numerals refer to like elements throughout. The embodiments are described below in order to explain the present general inventive concept by referring to the figures.

Figure 1:
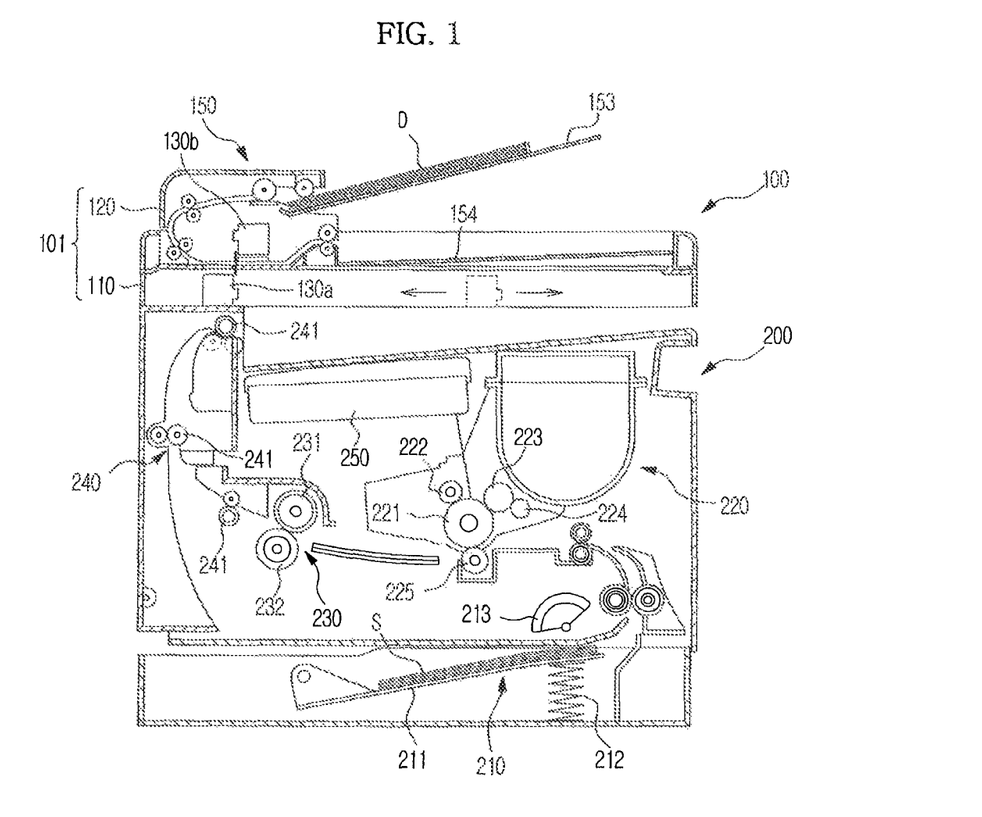
FIG. 1 is a diagram illustrating an embodiment of an image forming apparatus in accordance with the present general inventive concept.
Figure 2:
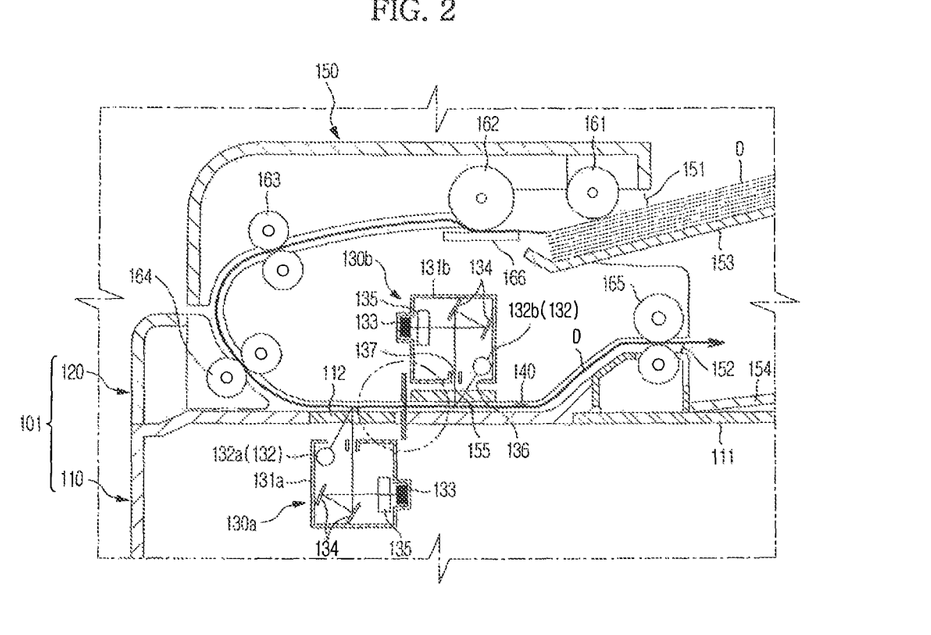
FIG. 2 is a diagram illustrating a partial constitution of an image reading device in accordance with the present general inventive concept.

FIG. 1 is a diagram illustrating a constitution of an embodiment of an image forming apparatus according to the present general inventive concept, and FIG. 2 is a diagram of a partial constitution of an embodiment of an image reading device according to the present general inventive concept.

As illustrated in FIG. 1, an image forming apparatus of the present embodiment may include an image reading device 100 to read image information recorded on a document and a printing device 200 (e.g., image forming device) to print an image on a printing medium, e.g., paper.

The printing device 200 may print the image in response to a signal from the image reading device 100 or a signal from an external apparatus such as a computer, etc. The printing device 200 may include a paper feeding unit 210 to supply a printing medium, e.g., paper S, a developing unit 220 to develop the image on the paper, a fusing unit 230 to fuse the developed image to the paper by applying heat and/or pressure to the paper, and a paper discharge unit 240 to discharge the printed paper to the outside.

The paper feeding unit 210 may include a paper feeding tray 211 to load the paper S thereon, and a spring 212 to elastically support the paper feeding tray 211. The paper loaded on the paper feeding tray 211 is picked up by a pickup roller 213 sheet by sheet, and fed toward the developing unit 220.

The developing unit 220 may include a photosensitive drum 221 on which an electrostatic latent image is formed by an exposure unit 250, a charge roller 222 to charge the photosensitive drum 221, a developing roller 223 to develop the electrostatic latent image formed on the photosensitive drum 221 into a toner image, a supply roller 224 to supply a toner to the developing roller 223, and a transfer roller 225 to press the paper toward the photosensitive drum 221 to transfer the toner image developed on the photosensitive drum 221 onto the printing medium, e.g., the paper S.

The fusing unit 230 may include a heat roller 231 having a heat source to heat the toner image transferred onto the paper, and a press roller 232 preferably disposed to oppose the heat roller 231 to maintain a constant fusing pressure with the heat roller 231.

The paper discharge unit 240 may include paper discharge rollers 241 sequentially mounted to discharge the paper having passed through the fusing unit 230 to the outside.

As illustrated in FIGS. 1 and 2, the image reading device 100 according to an embodiment of the present general inventive concept may include a main body 101 configured with a scanning frame 110 and a cover 120, and a first reading unit 130*a* and a second reading unit 130*b* to read image information of the document D by irradiating light to the document D. The cover 120 is coupled (e.g., hinged) to the scanning frame 110 to move between an open position and a closed position that may shield a top surface of the scanning frame 110.

The first reading unit 130*a* and the second reading unit 130*b* may be arranged opposite to each other while a document feeding path 140 is provided therebetween. For example, the first reading unit 130*a* may be disposed below the document D passing through the document feeding path 140 to read image information from a first surface of the document, and the second reading unit 130*b* may be disposed above the document D passing through the document feeding path 140 to read image information (e.g., offset concurrent information) from a second surface of the document, which may be one of various sizes.

The first reading unit 130*a* and the second reading unit 130*b* preferably include a first reading unit case 131*a* and a second reading unit case 131*b*, respectively, which may form an external appearance. The first reading unit 130*a* may include a light source 132, an image sensor 133, plural reflecting members 134, and a condensing lens 135, which are preferably accommodated in the first reading unit case 131*a*. The second reading unit 130*b* may include a light source 132, an image sensor 133, plural reflecting members 134, and a condensing lens 135, which are preferably accommodated in the second reading unit case 131*b*. The light source 132 irradiates light to the document, and the image sensor 133 receives the light reflected from the document and converts the light into an electric signal. The plural reflecting members 134 may reflect the light reflected from the document to the image sensor 133. The condensing lens 135 is preferably disposed at the front of the image sensor 133 in an optical path to condense the light on the image sensor 133. Hereinafter, when it is needed to separately explain the light sources of the first reading unit 130*a* and the second reading unit 130*b*, the light source of the first reading unit 130*a* will be referred to as a first light source 132*a*, and the light source of the second reading unit 130*b* will be referred to as a second light source 132*b*. In an embodiment of an image forming apparatus, additional reading units may be included and positioned in a similar manner.

The first reading unit case 131*a* and the second reading unit case 131*b* include light irradiation holes 136 through which the light emitted from the light sources 132 can reach the document and light transmittance holes 137 through which the light reflected from the document can be transmitted to the interiors of the reading unit cases 131*a* and 131*b*.

The second reading unit 130*b* may be mounted in the cover 120. An automatic document feeder (ADF) 150 is provided at the cover 120 to automatically feed documents for successive scanning.

The ADF 150 includes a document inlet port 151 to supply the document to be scanned, a document outlet port 152 to discharge the scanned document, a document feeding path 140 (e.g., in the cover 120) to feed the document therethrough, and rollers to feed the document that may be mounted in the document feeding path 140.

The document inlet port 151 is formed at a portion of the cover 120, and the document outlet port 152 is preferably formed below the document inlet port 151. A document feeding tray 153 to load the document D to be fed by the ADF 150 is provided near the document inlet port 151. A document discharge tray 154, on which the scanned document is discharged and loaded, is provided near the document outlet port 152.

The document feeding path 140 may be formed in a substantially C shape. However, the present general inventive concept is not intended to be so limited. One end of the document feeding path 140 is connected to the document feeding tray 153 through the document inlet port 151, and the other end of the document feeding path 140 is connected to the document discharge tray 154 through the document outlet port 152. For the first reading unit 130*a* and the second reading unit 130*b* to read image information recorded on the document D passing through the document feeding path 140, a first ADF glass 112 and a second ADF glass 155 are sequentially arranged in the document feeding path 140. The first ADF glass 112 may be mounted in the scanning frame 110 at a position corresponding to the first reading unit 130*a*, and the second ADF glass 155 may be mounted in the cover 120 at a position corresponding to the second reading unit 130*b*.

Document moving devices may be coupled to move the document D along the document feeding path 140. For example, rollers to feed the document may include a document pickup roller 161 to pick up the document D loaded on the document feeding tray 153, first to third feeding rollers 162, 163 and 164 to feed the document picked up by the document pickup roller 161 in the document feeding path 140, and a discharge roller 165 to discharge the scanned document to the document discharge tray 154. The first feeding roller 162 positioned closest to the document pickup roller 161 may also function to separate individual sheets of the document picked up by the document pickup roller 161. For this, a friction pad 166 may be mounted while opposing the first feeding roller 162.

The first reading unit 130*a* is preferably mounted at the scanning frame 110, and a flat glass 111 and the first ADF glass 112 may be mounted on the top surface of the scanning frame 110. A user puts the document on the flat glass 111 sheet by sheet to scan the document. The first reading unit 130*a* can move along the flat glass 111 below the flat glass 111 to scan image information recorded on the document put on the flat glass 111. The first reading unit 130*a* also can be displaced below the first ADF glass 112 to scan image information recorded on the document fed by the ADF 150.

As illustrated in FIGS. 1 and 2, the first reading unit 130*a* and the second reading unit 130*b* may be arranged in misalignment with each other along a document feeding direction. For example, the second reading unit 130*b* is positioned at a predetermined distance from the first reading unit 130*a* along the document feeding direction. If the first reading unit 130a and the second reading unit 130b are arranged as described above, the light emitted from the first light source 132a toward the document D and the light emitted from the second light source 132b toward the document D are irradiated to the document D at a long distance from each other, which may reduce or prevent the distortion of the image information due to the light interference near the document D (e.g., through and/or reflected by the document D).

Figure 3:
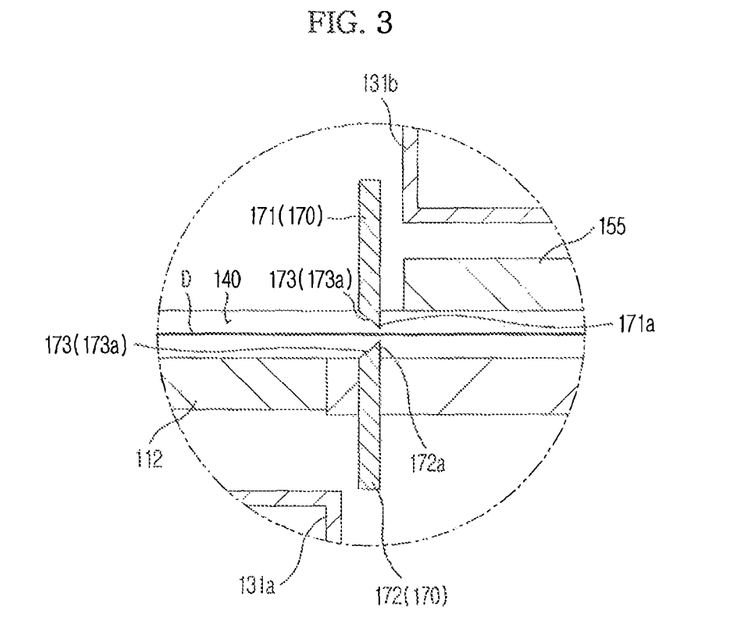
FIG. 3 is diagram illustrating an enlarged view of a partial constitution of the image reading device depicted in FIG. 2.

FIG. 3 is diagram illustrating an enlarged view of a partial constitution of the image reading device depicted in FIG. 2. As illustrated in FIGS. 2 and 3, at least one light shielding member 170 may be mounted between the first reading unit 130a and the second reading unit 130b along the document feeding direction. The light shielding member 170 may operate to shield the light irradiated from the first light source 132a to the document D from being transmitted to the second reading unit 130b, and/or also to shield the light irradiated from the second light source 132b to the document D from being transmitted to the first reading unit 130a. Preferably, the light shielding member 170 has a dark color to effectively shield (e.g., block and/or absorb) the light emitted from the light source 132.

The light shielding member 170 may include a first light shielding member 171 mounted in the cover 120, and a second light shielding member 172 mounted in the scanning frame 110. The first light shielding member 171 may extend in a direction different from (e.g., not parallel to) the document feeding direction so that one end portion 171a of the first light shielding member 171 is positioned in the document feeding path 140. Similarly, the second light shielding member 172 may extend in a direction different from the document feeding direction so that one end portion 172a of the second light shielding member 172 is positioned in the document feeding path 140. FIG. 3 illustrates that the first light shielding member 171 and the second light shielding member 172 extend vertically or substantially vertically toward the document feeding path 140. Although the embodiment of FIG. 3 illustrates that the light shielding members are respectively mounted in the cover 120 and the scanning frame 110, it may be possible to mount the light shielding member(s) in only the cover 120 or the scanning frame 110.

One end portion 171a of the first light shielding member 171 and one end portion 172a of the second light shielding member 172, which are located adjacent to the document D, may be provided with document guide portions 173 to guide the document (e.g., to smoothly feed the document). For example, the document guide portions 173 may be configured as inclined surfaces 173a (e.g., linear or non-linear), which are inclined downwardly or upwardly, along the document feeding direction. However, embodiments according to the present general inventive concept are not intended to be so limited, for example, a guide portion may have three-dimensional characteristics.

Figure 4:
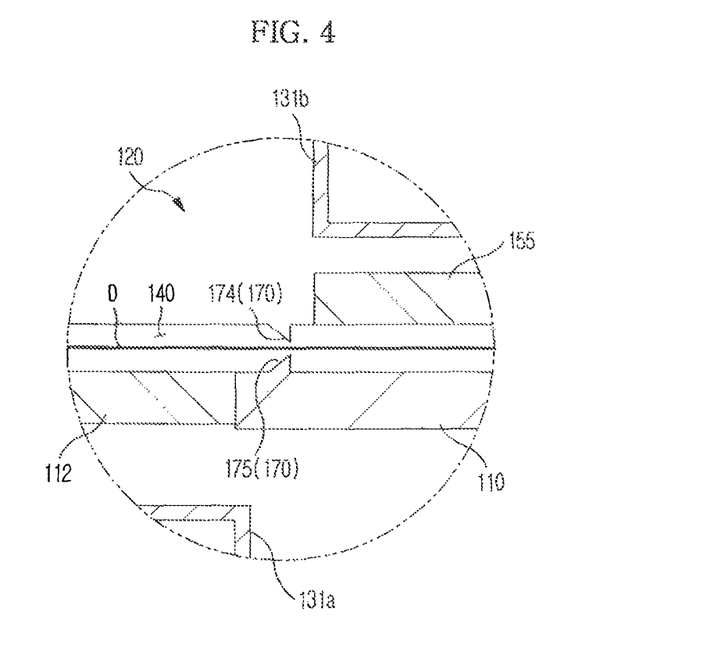
FIGS. 4 to 6 are diagrams illustrating modified examples of a light shielding member in accordance with the present general inventive concept.
Figure 5:
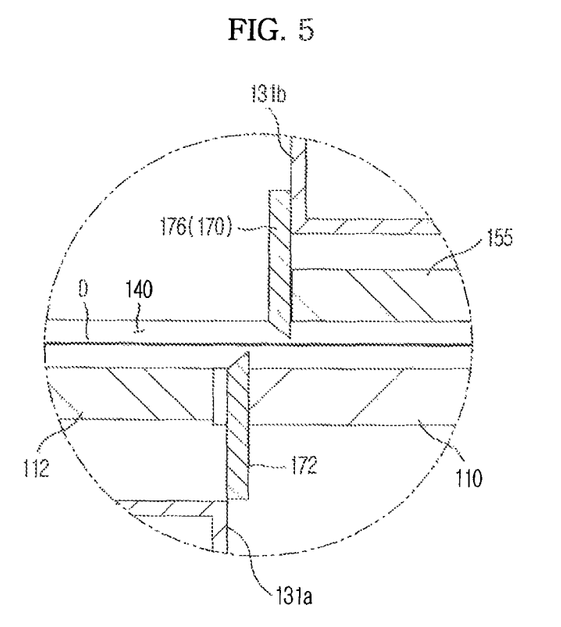
Figure 6:
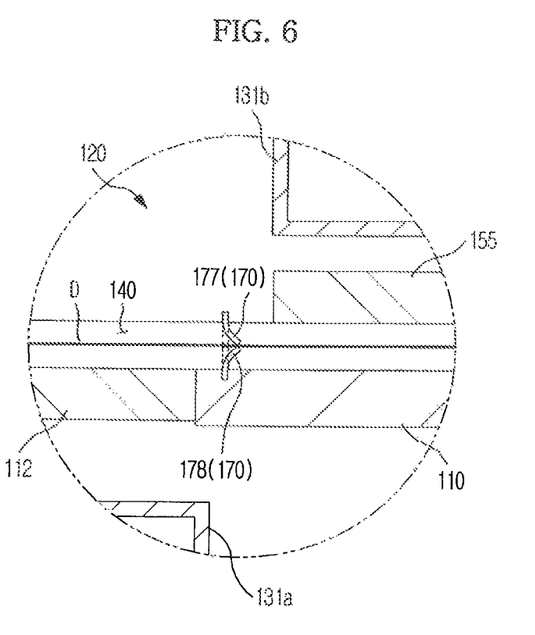

FIGS. 4 to 6 are diagrams illustrating additional modified examples of light shielding members according to other embodiments of the present general inventive concept. As illustrated in FIG. 4, a first light shielding member 174 may be integrally formed with the cover 120, and a second light shielding member 175 may be integrally formed with the scanning frame 110. If the light shielding member 170 is integrally formed with the cover 120 or the scanning frame 110 as described above, a process of mounting the light shielding member 170 in the cover 120 or the scanning frame 110 becomes unnecessary, and thus productivity may be increased or cost decreased.

As illustrated in FIG. 5, a first light shielding member 176 may be mounted to the second reading unit case 131b. Preferably, the first light shielding member 176 is integrally formed with the second reading unit case 131b. FIG. 5 illustrates that a second light shielding member 172 may be mounted in the scanning frame 110 in consideration of the movement of the first reading unit 130a. However, when the first reading unit 130a is fixedly mounted under the first ADF glass 112, the second light shielding member 172 also may be mounted to the first reading unit case 131a or may be integrally formed with the first reading unit case 131a. Also as illustrated in FIG. 5, to effectively shield the light, the first light shielding member 176 and the second light shielding member 172 may be arranged at a predetermined distance from each other along the document feeding direction (and separated from the reading units). This may more effectively shield the light.

As illustrated in FIG. 6, the light shielding member 170 may be made of a flexible material or an elastically deformable material. The light shielding member 170 can effectively shield the light without disturbing the movement of the document. When the document D does not pass, a first light shielding member 177 and a second light shielding member 178 may be maintained in a state illustrated by a dotted line in FIG. 6. On the other hand, when the document D passes, the first light shielding member 177 and the second light shielding member 178 are pushed by the fed document, and may be deformed to a state illustrated by a solid line in FIG. 6. Preferably, the first light shielding member 177 mounted in the cover 120 is made of a flexible material, and the second light shielding member 178 mounted in the scanning frame 110 is made of an elastically deformable material. The first light shielding member 177 also may be made of an elastically deformable material. However, since the first light shielding member 177 can be restored to its original state (e.g., a state illustrated by the dotted line in FIG. 6) by the gravity without an elastic force, the first light shielding member 177 made of a flexible material can effectively perform its role.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of an image reading device and methods thereof according to the present general inventive concept can reduce or prevent the interference between the light irradiated toward the document from the first reading unit and the second reading unit that are arranged or positioned to oppose each other and may operate concurrently. Embodiments of an image reading device and methods thereof can reduce or prevent the light emitted from one of two reading units from being transmitted to the other reading unit. Accordingly, the deterioration of a scan quality because of the distortion of image information can be reduced or prevented.

Further, since a light shielding member may mounted in the main body of the image reading device or the case of the reading unit, the light shielding member can be conveniently employed without complicating the inner structure of the reading unit or increasing size thereof.

Although few embodiments of the present general inventive concept have been illustrated and described, it would be appreciated by those skilled in the art that changes may be made in these embodiments without departing from the principles and spirit of the general inventive concept, the scope of which is defined in the claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transitional terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. An image reading device comprising:
   a first automatic document feeder (ADF) glass;
   a second ADF glass disposed at a predetermined distance from the first ADF glass along a document feeding direction;
   a first reading unit disposed at a position corresponding to the first ADF glass to read image information recorded on a first surface of a document;
   a second reading unit disposed at a position corresponding to the second ADF glass to read image information recorded on a second surface of the document; and
   at least one light shielding member mounted between the first reading unit and the second reading unit along the document feeding direction, the at least one light shielding member being adjacent to at least one of the first ADF glass and second ADF glass to shield the light irradiated via the first reading unit to the document from being transmitted to the second reading unit, the at least one light shielding member including a first light shielding member and a second light shielding member disposed at a predetermined distance from the first light shielding member along the document feeding direction.

2. The image reading device according to claim 1, wherein the at least one light shielding member extends in a direction different from the document feeding direction.

3. The image reading device according to claim 1, wherein the at least one light shielding member is provided with a document guide portion to guide the document.

4. The image reading device according to claim 1, further comprising:
   a scanning frame; and
   a cover to cover the scanning frame,
   wherein the first reading unit and the second reading unit are respectively disposed in the scanning frame and the cover, and
   wherein the at least one light shielding member is mounted in at least one of the scanning frame and the cover.

5. The image reading device according to claim 4, wherein the at least one light shielding member is integrally formed with at least one of the scanning frame and the cover.

6. The image reading device according to claim 1, wherein the first reading unit and the second reading unit respectively include a first reading unit case and a second reading unit case to form an external appearance,
   and wherein the at least one light shielding member is mounted on at least one of the first reading unit case and the second reading unit case.

7. The image reading device according to claim 6, wherein the at least one light shielding member is integrally formed with the at least one of the first reading unit case and the second reading unit case.

8. The image reading device according to claim 1, wherein the at least one light shielding member is made of a flexible material or an elastically deformable material.

9. The image reading device according to claim 1, wherein at least one of the first reading unit and the second reading unit is configured to read the image information of the document with light, and the at least one light shielding member has a dark color.

10. An image forming apparatus comprising the image reading device according to claim 1.

11. An image forming apparatus comprising:
    an image reading device including a main body having a document feeding path, a first reading unit to read image information recorded on a first surface of the document passing through the document feeding path, and a second reading unit to read image information recorded on a second surface of the document passing through the document feeding path, the second reading unit being disposed adjacent to the first reading unit along a document feeding direction; and
    at least one light shielding member mounted between the first reading unit and the second reading unit along the document feeding direction to shield light irradiated toward the document from at least one of the first reading unit and the second reading unit from being transmitted to the other reading unit,
    wherein the at least one light shielding member includes a sheet member having one end located in the document feeding path.

12. The image forming apparatus according to claim 11, wherein the main body of the image reading device includes a scanning frame mounted with the first reading unit, and a cover mounted with the second reading unit,
    and wherein the at least one light shielding member includes a first light shielding member to extend from the cover toward the document feeding path, and a second light shielding member to extend from the scanning frame toward the document feeding path.

13. The image reading apparatus according to claim 12, wherein the first light shielding member and the second light shielding member are integrally formed with the cover and the scanning frame, respectively.

14. The image forming apparatus according to claim 11, wherein the first reading unit and the second reading unit respectively include a first reading unit case and a second reading unit case,
    and wherein the at least one light shielding member includes a first light shielding member to extend from the second reading unit case toward the document feeding path, and a second light shielding member to extend from the first reading unit case toward the document feeding path.

15. The image forming apparatus according to claim 14, wherein the first light shielding member and the second light shielding member are respectively integrally formed with the second reading unit case and the first reading unit case.

16. The image forming apparatus according to claim 11, wherein the at least one light shielding member is provided with an inclination surface to guide the document passing through the document feeding path.

17. The image forming apparatus according to claim 11, wherein the at least one light shielding member is made of a flexible material or an elastically deformable material.

18. An image forming apparatus comprising:
an image reading device including a first reading unit to read image information recorded on a first surface of a document, and a second reading unit disposed in misalignment with the first reading unit along a document feeding direction to read image information recorded on a second surface of the document, the second reading unit being adjacent to the first reading unit;
at least one light shielding member mounted between the first reading unit and the second reading unit along the document feeding direction to reduce receipt of light irradiated toward the document from at least one of the first reading unit and the second reading unit by the other reading unit;
a first reading unit case to surround the first reading unit; and
a second reading unit case to surround the second reading unit,
wherein the at least one light shielding member is mounted on at least one of the first reading unit case and the second reading unit case or the at least one light shielding member is integral to the at least one of the first reading unit case and the second reading unit case.

19. The image forming apparatus according to claim 18, wherein the at least one light shielding member is configured to locate one end portion of the light shielding member in a document feeding path.

20. The image forming apparatus according to claim 18, wherein the image reading device includes a main body having a document feeding path, wherein the main body comprises:
a scanning frame mounted with the first reading unit; and
a cover mounted with the second reading unit,
wherein the second reading unit is disposed at a predetermined distance from the first reading unit along the document feeding path, and
wherein the at least one light shielding member includes a first light shielding member to extend from the cover toward the document feeding path and a second light shielding member to extend from the scanning frame toward the document feeding path to block light rays from traveling through the document feeding path from each of the first and second reading units to the other reading unit.

21. The image forming apparatus according to claim 20, wherein the first light shielding member and the second light shielding member are offset.

22. The image forming apparatus according to claim 18, wherein the at least one light shielding member is provided with a guide surface having a prescribed configuration to guide the document along the document feeding direction.

23. The image forming apparatus according to claim 18, wherein the at least one light shielding member is configured to be a flexible material, an elastically deformable material or a dark color.

* * * * *